(12) United States Patent
Graf et al.

(10) Patent No.: US 10,007,250 B2
(45) Date of Patent: Jun. 26, 2018

(54) MECHANICAL POSITIONING DEVICE AND METHOD

(71) Applicant: HEXAGON METROLOGY S.P.A., Moncalieri, Turin (IT)

(72) Inventors: Roland Graf, Untereggen (CH); Marco Forneris, Turin (IT)

(73) Assignee: HEXAGON METROLOGY S.P.A., Turin (IT)

( * ) Notice: Subject to any disclaimer, the term of this patent is extended or adjusted under 35 U.S.C. 154(b) by 407 days.

(21) Appl. No.: 14/422,657

(22) PCT Filed: Aug. 7, 2013

(86) PCT No.: PCT/EP2013/066545
§ 371 (c)(1),
(2) Date: Feb. 19, 2015

(87) PCT Pub. No.: WO2014/029622
PCT Pub. Date: Feb. 27, 2014

(65) Prior Publication Data
US 2015/0227132 A1    Aug. 13, 2015

(30) Foreign Application Priority Data

Aug. 20, 2012 (EP) .................................. 12425140

(51) Int. Cl.
*G05B 19/402* (2006.01)
*B62D 65/02* (2006.01)
(Continued)

(52) U.S. Cl.
CPC ......... *G05B 19/402* (2013.01); *B62D 65/024* (2013.01); *G01B 11/002* (2013.01); *G01B 21/047* (2013.01); *G05B 2219/35162* (2013.01)

(58) Field of Classification Search
CPC ........ G05B 19/402; G05B 2219/35162; G01B 11/002; G01B 21/047; B62D 65/024
(Continued)

(56) References Cited

U.S. PATENT DOCUMENTS 2,135,195 A * 11/1938 Morse .................... G01B 5/255
                                                        104/44
4,035,093 A *  7/1977 Redshaw .............. F16B 5/0225
                                                        16/237
(Continued)

FOREIGN PATENT DOCUMENTS

CN         1576143 A      2/2005
CN         1200836 C      5/2005
(Continued)

OTHER PUBLICATIONS

European Search Report dated Feb. 1, 2013 as received in Application No. 12 42 5140.
(Continued)

*Primary Examiner* — Mohammad Ali
*Assistant Examiner* — Joshua Sanders
(74) *Attorney, Agent, or Firm* — Maschoff Brennan

(57) ABSTRACT

The invention pertains to a reference positioning system for positioning a workpiece in a three-dimensional coordinate system, the reference positioning system comprising a first positioning unit for positioning a first alignment feature of the workpiece in a first dimension, in a second dimension and in a third dimension, comprising a first centring pin and a first reference level locator, a second positioning unit for positioning a second alignment feature of the workpiece in the second dimension and in the third dimension, comprising a second centring pin and a second reference level locator, and a third positioning unit for positioning a third (Continued)

alignment feature of the workpiece in the third dimension, comprising a third reference level locator.

24 Claims, 7 Drawing Sheets

(51) Int. Cl.
  *G01B 21/04* (2006.01)
  *G01B 11/00* (2006.01)
(58) Field of Classification Search
  USPC .......................................................... 700/114
  See application file for complete search history.

(56) References Cited

U.S. PATENT DOCUMENTS

| | | | |
|---|---|---|---|
| 4,041,294 A * | 8/1977 | Inoyama | B23P 19/105 |
| | | | 29/596 |
| 4,143,868 A * | 3/1979 | Bergman | B23Q 1/38 |
| | | | 269/20 |
| 4,364,182 A * | 12/1982 | Jones | G01B 3/30 |
| | | | 33/567 |
| 4,796,346 A * | 1/1989 | Kawasaki | B62D 65/02 |
| | | | 29/467 |
| 6,094,124 A | 7/2000 | Lee | |
| 6,105,264 A * | 8/2000 | Phillips | G01B 5/0002 |
| | | | 33/288 |
| 7,188,832 B2 | 3/2007 | Kita et al. | |
| 8,555,478 B2 | 10/2013 | Niessen et al. | |
| 2004/0026591 A1* | 2/2004 | Lambrecht | G01B 5/255 |
| | | | 248/352 |
| 2007/0173113 A1 | 7/2007 | Maruo et al. | |
| 2009/0302517 A1* | 12/2009 | Patel | B25B 1/22 |
| | | | 269/71 |
| 2010/0070067 A1* | 3/2010 | Koo | H05K 13/08 |
| | | | 700/114 |

FOREIGN PATENT DOCUMENTS

| | | |
|---|---|---|
| CN | 1946513 A | 4/2007 |
| CN | 102120470 A | 7/2011 |
| DE | 195 44 240 A1 | 6/1996 |
| DE | 200 12 052 U1 | 10/2000 |
| DE | 10 2010 007 379 A1 | 8/2011 |
| DE | 10 2010 030 468 A1 | 12/2011 |
| JP | 11263428 A * | 9/1999 |

OTHER PUBLICATIONS

Lichtenberg, Thilo (2006): "A flexible vehicle measurement system for modern automobile production" (Master Thesis at the Faculty of Engineering, the Built Environment and Information Technology of the Nelson Mandela Metropolitan University).

* cited by examiner

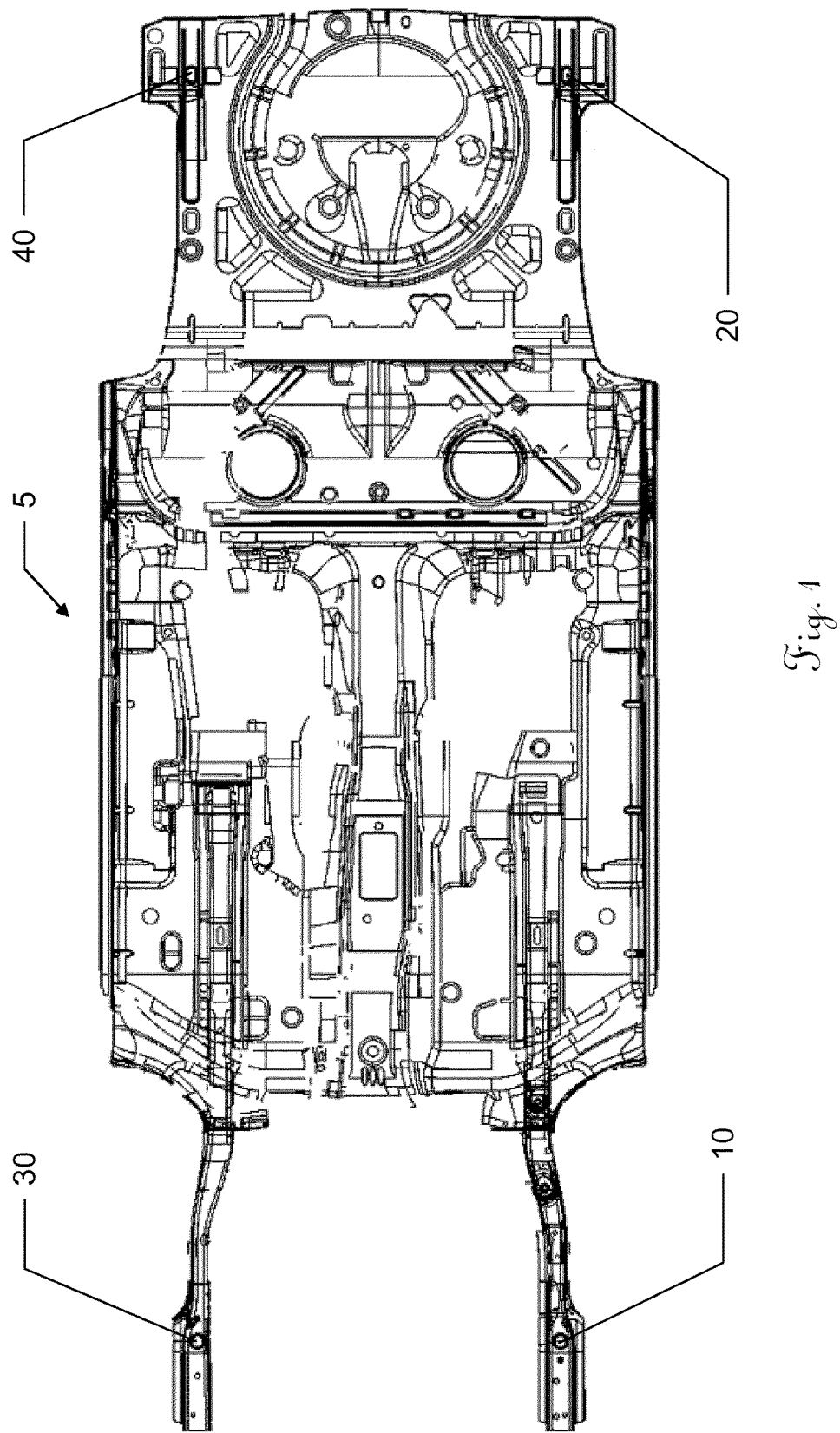

MECHANICAL POSITIONING DEVICE AND METHOD

FIELD OF THE INVENTION

The present invention pertains to a method and device for precise mechanical positioning and orienting of an object in space. In particular the invention relates to a method and system for highly repeatable and highly precise setting up of an object in a given coordinate system, especially for measuring purposes during production. More particularly, the present invention relates to a method and device for arranging main body parts of an automobile for assembly or measuring in an automobile assembly line.

BACKGROUND

The method and device according to the present invention correspond to the mechanical solution of the metrological alignment principle known as "Reference Positioning System" (RPS). The principle for placement and alignment according to the RPS, for instance, is described in Lichtenberg, Thilo (2006): "*A flexible vehicle measurement system for modern automobile production*" (Master Thesis at the Faculty of Engineering, the Built Environment and Information Technology of the Nelson Mandela Metropolitan University).

It is common practice during the production of a car to measure features and properties of its different components. These measurements can be carried out in special measurement cells by means of either contact or non contact measuring gauges, for example based on laser or photogrammetric principles. Such a procedure, for instance, is disclosed in DE 195 44 240 A1.

Large workpieces, especially sheet metal parts, such as car bodies, can have significant production tolerances. The deviation of a car body can be as large as 2 mm in length, whereas the measurement tolerance is comparatively small, for example about 150 μm. This means that the alignment of the workpiece—its mechanical exact positioning and orienting—is a challenging task.

A workpiece, such as a car body, can be very heavy, which means that the generated forces and friction can be very high, especially if the contact angles are not flat and the contact areas are very small. Furthermore, the loading of the part into the measurement cell is either relatively inaccurate or requires high effort and cost.

In many known applications the means by which the alignment of a component is defined cannot be measured during the measurement process itself as throughout the whole measurement process the measured component is held on the very same means. Thus, access to these means is blocked for measuring equipment. Therefore, in these applications it is essential for overall accuracy of any kind of measurement equipment to have the component placed exceptionally accurate and repeatable in a predefined position and orientation.

Partially, the alignment is already taken into consideration in the shape of certain alignment features of the workpiece. Typically, these alignment features comprise a circular hole, an elongated slot and a planar surface.

When designing the positioning units of the reference positioning system, a trade-off between maximum error in the Z-position and the ability of self-centring must be made. This means that a flat geometry causes little error in the Z-position, but makes it unlikely that the workpiece will be centred in the exact XY-position due to geometrical and also physical reasons, such as friction. In case the alignment features are not oriented completely orthogonal to the Z-axis, additional errors may occur. The dimensional tolerances of the alignment features themselves, such as the diameters of the circular hole and the elongated slot, are also critical.

Conventionally, there are two options to address this problem:

In the first option, the support, which for example can be a cylindrical bolt, is smaller than the minimum dimension of the alignment feature. This means that the position of the workpiece can vary within the maximum clearance space which is at least as big as the tolerance of the alignment feature. This tolerance includes the theoretical production variation and wearing effects caused by positioning the part in various assembly steps.

In the second option, the support has the form of a sphere or is conical, which means that it is self-centring in X and Y directions. But, as a consequence, its Z-position cannot be defined accurately.

Deviations in position or dimension of a workpiece's feature compared to its theoretical value are typically expressed by referring to the workpiece's own coordinate system, the Part Coordinate System (PCS). The PCS is defined during the design process of its corresponding workpiece. For measuring a position or dimension of a feature of the workpiece the PCS therefore needs to be connected to the measurement coordinate system, i.e. in the real three-dimensional space.

This alignment procedure preferably can be carried out by means of the "3-2-1 rules". In case of a statically determined placement of a rigid body the minimum number of constraints is used, which means that the location of one alignment feature is known in three dimensions (XYZ), the second in two (YZ) and the third in one dimension (Z). In other terms, the first location defines three degrees of freedom, the second two degrees of freedom and the third one degree of freedom. Therefore, six degrees of freedom are defined, and so are the position and orientation of a (rigid) workpiece. In the definitions of the workpiece, especially for sheet metal parts, there can be three features defined which serve that purpose, for example a circular hole, an elongated slot and a planar surface.

The part could be placed on conical pins which are movable in the X- and Y-dimensions. Their XY-position is read by measurement means, for instance by a laser tracker or preferably by encoder means, such as linear and/or rotary encoders, and the alignment of the workpiece is done based on those measurement data.

However, in some applications a clamping of the workpiece is required during the measurement, which means that some or all of the alignment features are clamped down of their nominal zero-position in the Z-dimension. In this case floating pins cannot be applied in a relatively uncomplicated way.

Furthermore, conical pins lead to a possibly inaccurate alignment with respect to their longitudinal axis, i.e. the Z-axis of the coordinate system, due to the production tolerance of the feature itself, e.g. of the diameter of its hole. This means that the alignment feature might not be leveled correctly in the Z-dimension.

Additionally, supporting an elongated slot (as typically used at the second feature) with a conical shaped pin causes high pressure at a very small contact area, leading to a wearing off of the material and thus to fewer accuracy.

SUMMARY

Some embodiments of the present invention provide a method and a device for accurate and repeatable positioning of a workpiece in three dimensions.

Some embodiments of the present invention provide such a method and device that avoids the disadvantages of the solutions known from prior art.

Some embodiments of the present invention provide such a method and device for subsequent measuring of the workpiece, in particular wherein the positioning and orienting of the workpiece has an accuracy corresponding to that of the measuring device and a higher accuracy than the tolerances of the measured features, in particular at least one order of magnitude higher.

Some embodiments of the present invention provide such a method and device, wherein the position and orientation of the workpiece can be fixed.

Some embodiments of the present invention provide such a method and device for a fully automatic alignment fixture in an automotive production line.

In terms of the invention, "positioning" of a workpiece is not understood as necessarily being a positioning in six degrees of freedom. Also, for instance, an orienting of the workpiece in three rotational degrees of freedom is understood as positioning.

According to the invention, centring pins are used to align a workpiece in a defined XY position by engaging alignment features of the workpiece, the defined position being independent from the alignment feature's production tolerances such as their diameters and their relative positions with respect to each other.

Positioning units of the reference positioning system comprise reception units for being contacted by alignment features of the workpiece to be positioned. The reception units at least comprise a reference level locator. At least two reception units additionally comprise a centring pin.

A first positioning unit comprises a first centring pin, preferably of conical or similar shape, which is designed for being introduced into a hole of a first alignment feature of the workpiece in order to position the first alignment feature fixedly in a first and a second dimension. According to the invention, at least the first centring pin—and preferably also a second centring pin of a second positioning unit—is moveable in the third dimension (in particular along the vertical axis), allowing the workpiece, after having been positioned in two dimensions, to move in the third dimension until it reaches a reference level located at known distances from a first reference level locator of the first positioning unit and further reference level locators of at least two more positioning units.

This reference level locator can be low-friction moveable in the first and second dimensions, which allows supporting the weight of the workpiece and self-centring of the workpiece by means of the first centring pins.

The movement of the centring pin can be passive as well as actively controlled, i.e. it could either be spring loaded or movable by actuators like motors, pneumatic systems or the like.

Preferably, the centring pins of the first and second positioning units are conical in order to fit the dimension variation of the alignment features they will lock (different diameter for every incoming part). The angle and surface of the conical shaped pins preferably are designed to prevent locking caused by friction.

Preferably, the surface of the centring pins and/or reference level locators is made of tempered steel or is hardened by other means, in order to prevent a wearing off of the material, which could reduce the accuracy of the centring or levelling, respectively. A wearing off for example could occur through abrasion, in particular every time when the pin is introduced into a hole not centrally.

In another preferred embodiment, for better supporting an elongated slot, the second centring pin is shaped similar to a pyramid or a hipped roof, so that in particular its cross section orthogonal to the direction of the workpiece's length is that of a prism. Thus, in comparison with a conical pin, the contact area between the pin and the slot is enlarged. The length of the pin is smaller than the length of the slot minus the tolerance of the workpiece. Advantageously, the pin is rotatable around the Z-axis in order to compensate for any angular error of the slot.

Preferably, built-in clamping means of the first or all positioning units allow fastening the workpiece at least to the first reference level locator. The clamping means, for instance, can comprise a hook that is provided in the centring pin, wherein for clamping the workpiece the hook moves radially first, and then pushes the workpiece downwards to the reference level locator. Multiple hooks per centring pin could be used for distributing the pulling force more evenly. Alternatively or additionally, the clamping means could also be a part of the reference level locator. For instance, a magnet or suction cup could be used for fixing sheet metal parts to the reference level locator.

In a preferred embodiment, four positioning units are used, all positioning units having a reference level locator for positioning the workpiece and clamping means that allow fastening the workpiece.

Preferably, the reference level locator, the centring pin or other parts of the reference positioning system comprises sensor means for detecting a contact with an alignment feature of the workpiece. In particular also a quality or value (pressure, centeredness, etc.) of the contact could be detected to check if the achieved accuracy of the alignment is within the tolerances of the present application.

The initial setting up of the centring pins and the XY planes in the required orientation and position preferably is supported by means of a measurement device, for example a laser tracker or, in the case of a measurement cell, the target measurement system itself.

In a preferred embodiment, more than one positioning unit has a retractable centring pin, in particular all positioning units. A further advantage of retractable centring pins is the prevention of damage to the centring pins as well as to the alignment features or other parts of the workpiece, when the workpiece is placed on the reference positioning unit.

There is no restriction for the positions of the alignment features of the workpiece, as the positions depend on the design of the workpiece. In particular, there is no need to have all alignment features on the same level. In a preferred embodiment, the positions of the positioning units with respect to each other are adaptable in three dimensions, for example in order to allow altering the design of the workpiece or to allow use of the same reference positioning system with different kinds of workpieces.

In a preferred embodiment, the setup of the positioning units of the reference positioning system can be programmable for different kinds of workpieces having different setups of alignment features. The positioning units thus can be positioned according to the alignment features' setup. Also, centring pins can be retracted or extracted depending on whether the respective alignment feature has a hole. Additional positioning units, not needed for the alignment of a certain workpiece could be lowered or moved out-of-the-way in order to not disturb the alignment.

In a preferred embodiment mechanical pre-aligning means are provided for approximately aligning the workpiece (or a skid on which the workpiece is automatically transported to the reference positioning system) before placing it on the reference positioning system, in order to ensure that the alignment features of the workpiece can be contacted by the positioning units.

In a preferred embodiment it is possible to confirm the repeatability of the reference positioning system by means of a measurement device, for example a laser tracker or, in the case of a measurement cell, the target measurement system itself, by measuring special features close to the alignment features. This confirmation cycle can be fully automated using the same infrastructure which in the production process controls the measurement equipment, or the calculation means of the measurement equipment.

In a preferred embodiment, a movability of at least one centring pin can be switched on and off. This way the functionalities of the different positioning units could be exchanged in order to be able to use one system set up for different variations of a workpiece, for instance as well for a right-hand-drive and a left-hand-drive car body.

In a preferable embodiment, three positioning units (the minimal number for the 3-2-1 concept) are used for determining the workpiece reference system and locating it in three-dimensional space. This means that all positioning units contribute to defining the Z-axis direction and position, the first positioning unit defines also X- and Y-axis position and the second positioning unit defines X- and Y-axis direction. Preferably, the alignment features of the workpiece comprise planar surfaces for defining a Z-position and Z-direction (all alignment features), a circular hole for defining an XY-position (first alignment feature) and an elongated slot for defining an XY-direction (second alignment feature).

The reference level locators of at least the second and third positioning units preferably are low-friction moveable in the first and second dimensions, which allows supporting the weight of the workpiece and self-centring of the workpiece by means of the first centring pins.

It should be noted that it is not necessary that all reference level locators or even a single reference level locator are arranged on the reference level, as the alignment features of the workpiece normally are not arranged on the same level either. Instead, the reference level is understood in such a way that the workpiece is aligned with respect to the reference level when the alignment features contact the reference level locators in the contact levels.

Another aspect of the invention is a positioning unit as a stand-alone solution, as the positioning units of the reference positioning system described above can also be used separately or in different combinations for positioning an alignment feature of a workpiece. This includes also the features clamping functionality and movable centring pins.

BRIEF DESCRIPTION OF THE DRAWINGS

The invention in the following will be described in detail by referring to exemplary embodiments that are accompanied by figures, in which:

FIG. 1 shows a workpiece with alignment features.

DETAILED DESCRIPTION

Figure 2A:
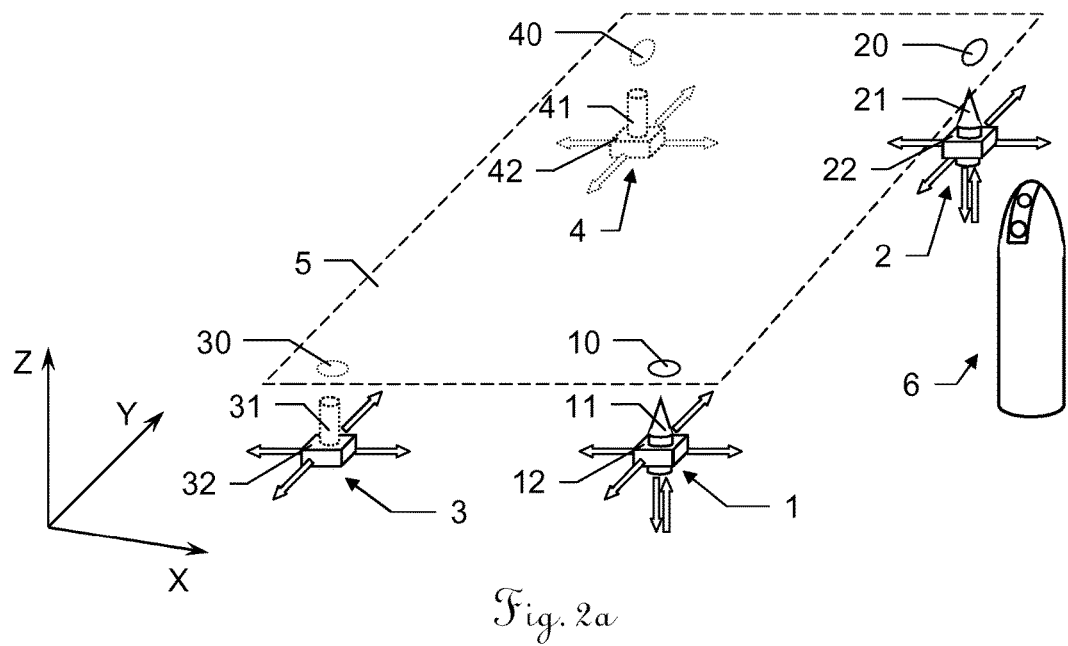
FIGS. 2a-b show an exemplary embodiment of the reference positioning system according to the invention.

In FIG. 1 a car body as an example of a workpiece 5 to be aligned is shown in a top plan view. A typical location of alignment features of the car body is shown. The depicted car body has four alignment features 10,20,30,40 positioned at known locations with respect to a part coordinate system and designed for being contacted by positioning units of a reference positioning system according to the invention, in particular for an insertion of centring pins. In this example the first alignment feature 10 and the third alignment feature 30 comprise a circular hole, the secondary alignment feature 20 and the additional feature 40 comprise an elongated slot. The additional feature 40 is only optional.

Figure 2B:
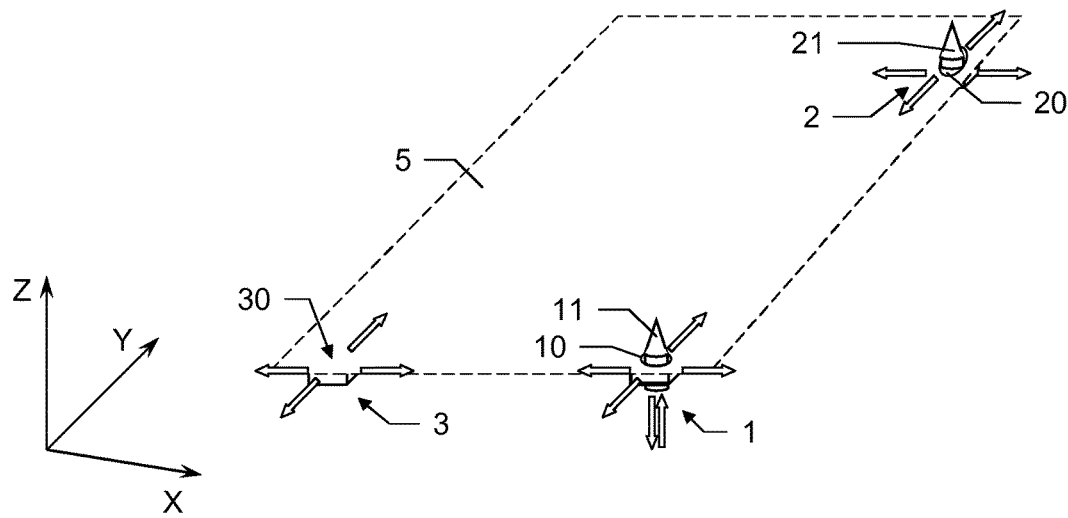

In the FIGS. 2a and 2b the working principle of a reference positioning system according to the invention is illustrated schematically. The depicted features are only simplified and symbolic illustrations.

The reference positioning system is set up in a three-dimensional coordinate system having a first dimension X, a second dimension Y and a third dimension Z, symbolized by the X-, Y- and Z-axes. In the depicted exemplary embodiments, the third dimension Z is basically vertical.

The reference positioning system is a part locator that guarantees the defined position and orientation of the workpiece 5 within the measurement volume of a 3D measurement device. The reference positioning system in particular can be used for car bodies or chassis parts as depicted in FIG. 1.

Two positioning units 1,2 of the reference positioning system have a centring pin 11,21 that guides the respective alignment feature 10,20 of the workpiece 5 to its theoretical position, within the mechanical repeatability of the reference positioning system. The other positioning units 3,4 optionally can have a pin 31,32, too.

Initial adjustment of the reference positioning system and/or of the single positioning units 1,2,3,4 with respect to their three-dimensional position is, for instance, provided by a laser tracker 6. Their relative position is calibrated before the placement of the first workpiece 5. All positioning units 1,2,3,4 are then fixed (for instance supported on a pillar) in the measuring volume of the 3D measurement device. Also a recalibration after a fixed number of workpieces 5 or at defined service intervals can be done using the laser tracker 6.

In FIG. 2a the reference positioning system is shown before the workpiece 5 is placed on top of it. The reference positioning system comprises at least three positioning units 1,2,3.

Also, an embodiment with more than three positioning units is possible. Depending on the position of the centroid of the workpiece relative to the first three positioning units 1,2,3 a fourth positioning unit 4 (which is depicted in FIG. 2a with dotted lines) can be necessary. Every positioning unit 1,2,3,4 comprises a reference level locator 12,22,32,42. These are fixed in the third dimension Z in a known distance from a reference level $Z_0$ (not shown) of the workpiece 5, and each define a contact level $Z_1, Z_2, Z_3, Z_4$ (not shown).

They are movable in the first and second dimension X,Y, in particular 5 mm in every direction, in order to facilitate the positioning adjustment of the workpiece 5, when it is placed on the reference positioning system. All or some of the positioning units 1,2,3,4 can comprise clamping means (not shown) for fixedly connecting the aligned workpiece to the positioning units 1,2,3,4. Alternatively, the workpiece 5 is fixed on the positioning units 1,2,3,4 by means of gravity.

The first positioning unit 1 comprises a first centring pin 11, in particular having a conical or similar shape as the first alignment feature 10 of the workpiece 5 comprises a circular hole. The second positioning unit 2 comprises a second centring pin 21, in particular having a pyramidal or similar shape as the second alignment feature 20 of the workpiece 5 comprises an elongated slot. Additionally, also the third positioning unit 3 and the optional fourth positioning unit 4 can have optional pins 31,41 (depicted with dotted lines). These pins are preferably cylindrical.

Each alignment feature 10,20,30,40 comprises a planar surface, designed to contact the reference level locators 12,22,32,42 in the contact level $Z_1,Z_2,Z_3,Z_4$ for positioning the workpiece 5 in the defined reference level $Z_0$. Also, especially if the corresponding positioning unit 1,2,3,4 comprises a centring pin 11,21,31,41, an opening is provided for accepting the centring pin 11,21,31,41 and positioning the alignment features 10,20,30,40 in the first dimension X and the second dimension Y. If the first centring pin 11 is shaped conically, the opening of the first alignment feature 10, preferably, is a circular hole.

In FIG. 2b the workpiece 5 is placed on a reference positioning system having three positioning units 1,2,3. The first positioning unit 1 is designed for aligning the first alignment feature 10 of the workpiece 5 in all three dimensions X,Y,Z, the second positioning unit 2 is designed for aligning the second alignment feature 20 in X- and Z-dimensions, and the third positioning unit 3 is designed for aligning the second alignment feature 30 in Z-dimension only. The three pins 11,21,31 are introduced into corresponding holes of the alignment features 10,20,30.

When the first centring pin 11 is introduced into the hole of the first alignment feature 10, this is centred on the first centring pin 11 and thus aligned in the first and second dimension X,Y. In order to ensure that the first alignment feature 10 not only is aligned in the first and second dimension X,Y, but also in the third dimension Z, according to the invention the first centring pin 11 is retractable in the third dimension Z behind the contact level $Z_1$. The first alignment feature 10, all the time remaining centred on the first centring pin 11, follows the retracting movement of the first centring pin 11 until it contacts the first reference level locator 12, thus reaching the contact level Z. The second alignment feature 20 is aligned with respect to the second dimension Y.

Normally,—for instance if the Z-axis is a vertical axis, and the workpiece 5 and the reference positioning system are undisturbed by outer influences—the first alignment feature 10 will remain in this exact alignment position autonomously. Additional clamping means (not shown) can be provided, though, for securely fixing the alignment position of the alignment features. The clamping could be necessary for instance if there are processes subsequent to the alignment in which the workpiece 5 is handled or contacted by processing machinery or measured by means of a contacting gauge head. Also, clamping can be used for counteracting an elasticity of the workpiece 5, which otherwise would prevent a contact of an alignment feature with a positioning unit and thus an exact alignment of the workpiece 5.

Figure 3A:
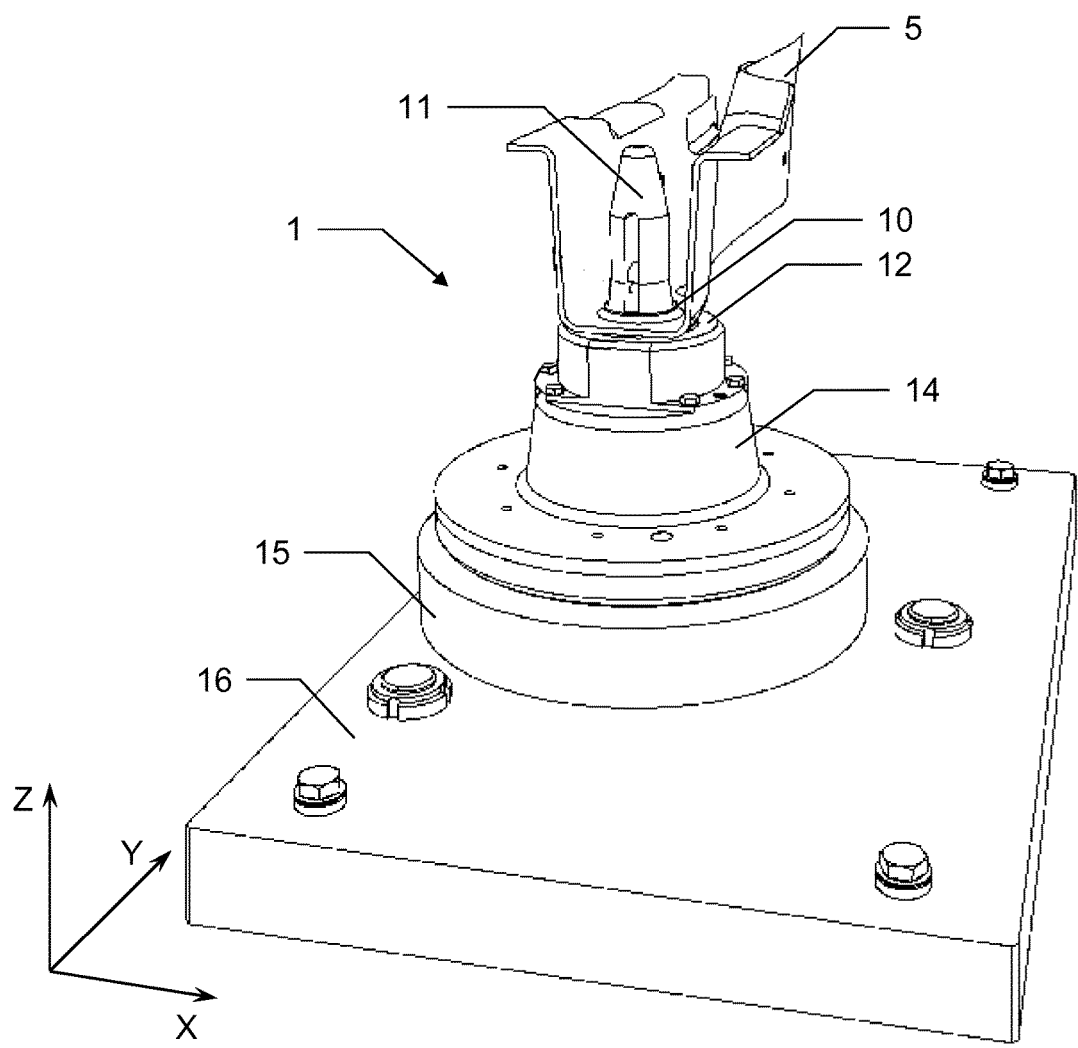
FIGS. 3a-d show an exemplary embodiment of the first positioning unit of a reference positioning system according to the invention.
Figure 3B:
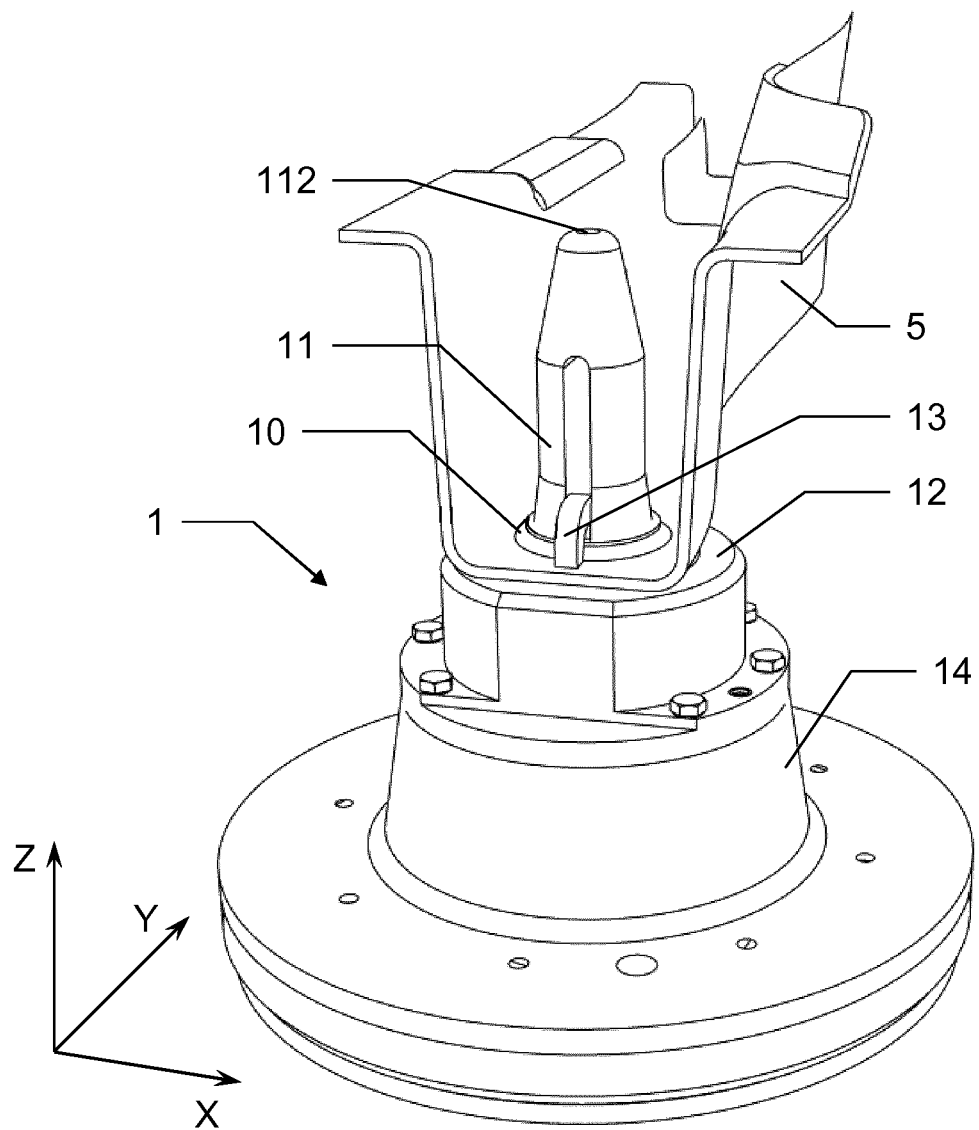
Figure 3C:
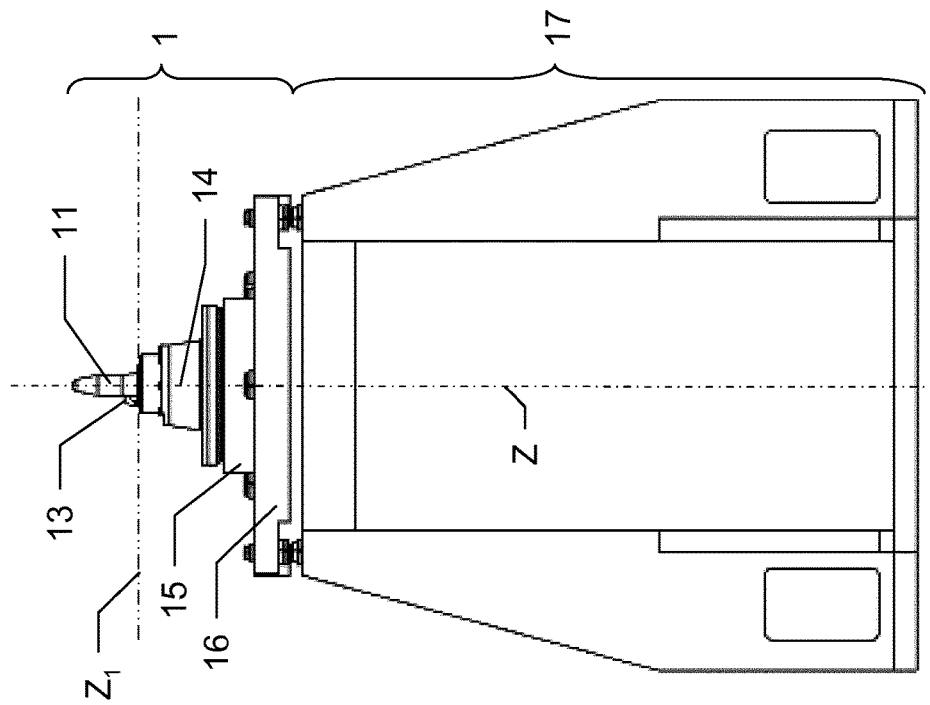
Figure 3D:
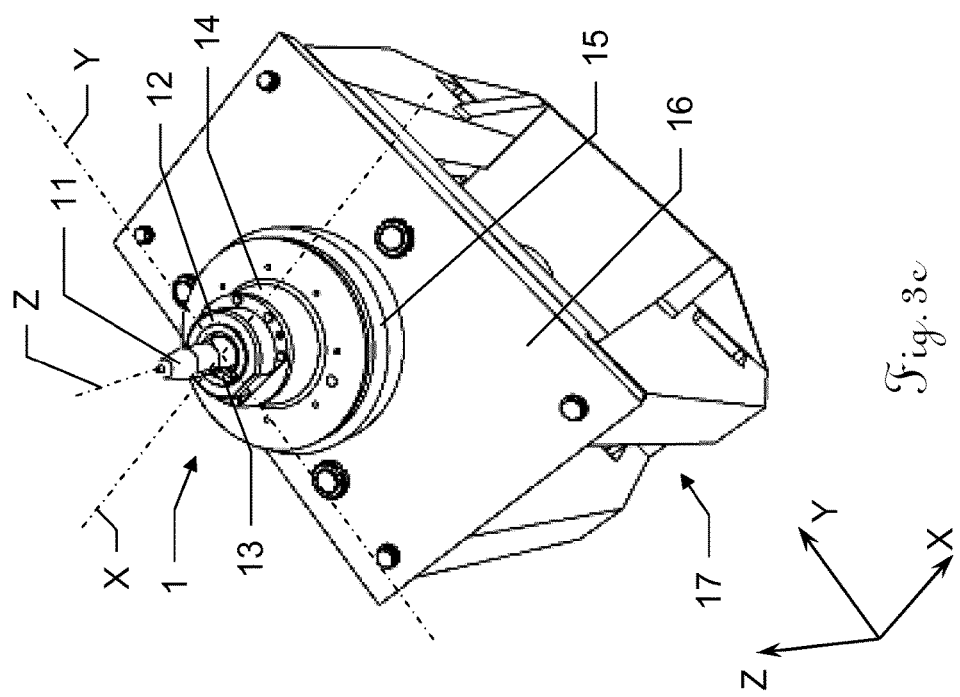

In FIGS. 3a-d an exemplary embodiment of the first positioning unit 1 of a reference positioning system according to the invention is depicted. The first positioning unit 1 comprises a basically conical centring pin 11 for insertion into the hole 10 of the workpiece 5, and a floating group 14, which is movable in a first and second dimension X,Y relative to a fixed group 15. The floating group 14 is fixed on the fixed group 15 with respect to the third dimension Z and has a reference level locator 12 located at a known distance from the workpiece's reference level $Z_0$ in the XY-plane and defining a first contact level Z. The centring pin 11 is connected to the fixed group 15 movable in the third dimension Z and fixed with respect to the first and second dimension X,Y. A hook is provided at the centring pin 11 for clamping the workpiece 5 to the reference level locator 12. The fixed group 15 is attached to a base 16. In FIGS. 3c and 3d an optional pillar 17 is shown on which the base 16 of the first positioning unit 1 can be placed.

When the workpiece 5 is placed on the reference positioning system, so that the first alignment feature 10 is roughly positioned over the first positioning unit 1, the centring pin 11 is inserted into the hole of the first alignment feature 10 of the workpiece 5. This can be done by actuator means (not shown) of the first positioning unit 1, designed for driving the centring pin 11 with respect to the fixed group 15 in the third dimension Z—usually a basically vertical direction. Thereby, the first alignment feature 10 is centred on the centring pin 11 with respect to the first and second dimensions X,Y—usually defining a basically horizontal plane.

Subsequently, the centring pin 11 is moved back into the fixed group 15 by the actuator means, so that a part of the centring pin 11 is retracted behind the reference level locator 12. The first alignment feature 10—all the time remaining centred on the pin 11—follows the movement of the centring pin 11 in the third dimension Z until contacting the reference level locator 12. With this contact, the first alignment feature 10 reaches its supposed position with respect to all three dimensions.

Figure 4A:
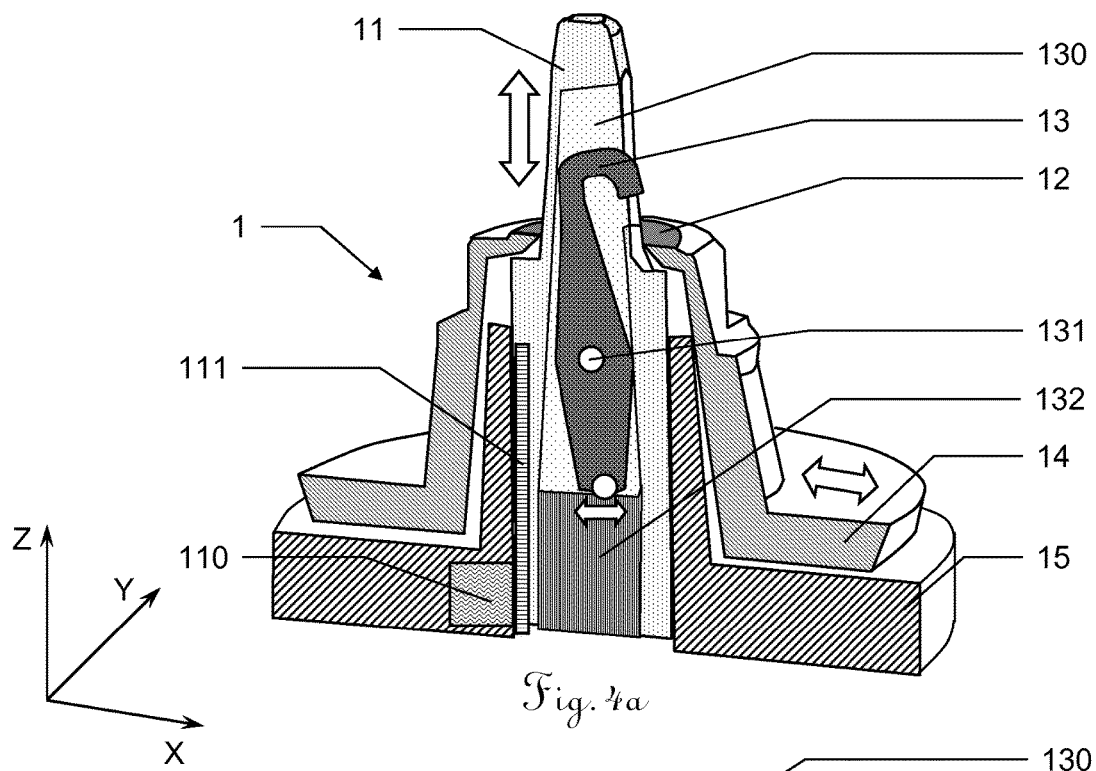
FIG. 4a-b show a sectional view of an exemplary embodiment of the first positioning unit.
Figure 4B:
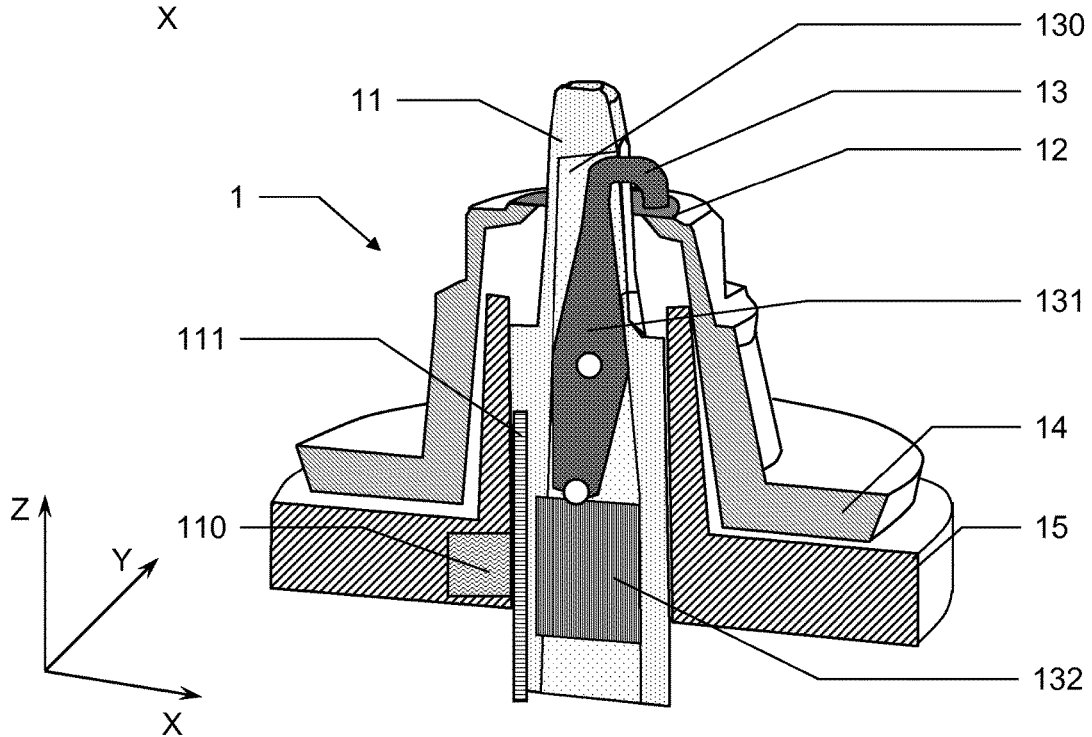

In FIGS. 4a and 4b a sectional view of the first positioning unit 1 from FIGS. 3a-d is depicted. The centring pin 11 is drivable in the third dimension Z by driving means 110 and transmission means 111 hidden inside the fixed part 15. The driving means 110, for instance, can be motor means, pneumatic means or hydraulic means. The centring pin 11 comprises a hook 13 as clamping means for fixing the alignment feature of the workpiece to the reference level locator 12. The hook 13 is movable in a hollow space 130 in the centring pin 11. Various means for driving the hook 13 are possible. In this example, the hook 13 is suspended tiltably around the Y-axis on an axle 131 and driven by a cylinder 132 rotatable around the Z-axis and movable in the third dimension Z. The reference level locator 12 is part of the floating group 14, which is attached to the fixed group 15 movably in the XY-plane, for instance by means of ball bearings (not shown).

In FIG. 4a the centring pin 11 is extracted into a centring position, in which a hole of an alignment feature (not shown) can be entered for self-centring of the hole on the centring pin 11 in the XY-plane. The hook 13 is retracted into the centring pin 11, for instance to allow the pin 11 to enter the hole. In FIG. 4b the centring pin 11 is partially retracted into the fixed group 15 to ensure a contact of the alignment feature with the reference level locator 12. Additionally, the hook 13 has been moved into a clamping position for fixing this contact.

Figure 5:
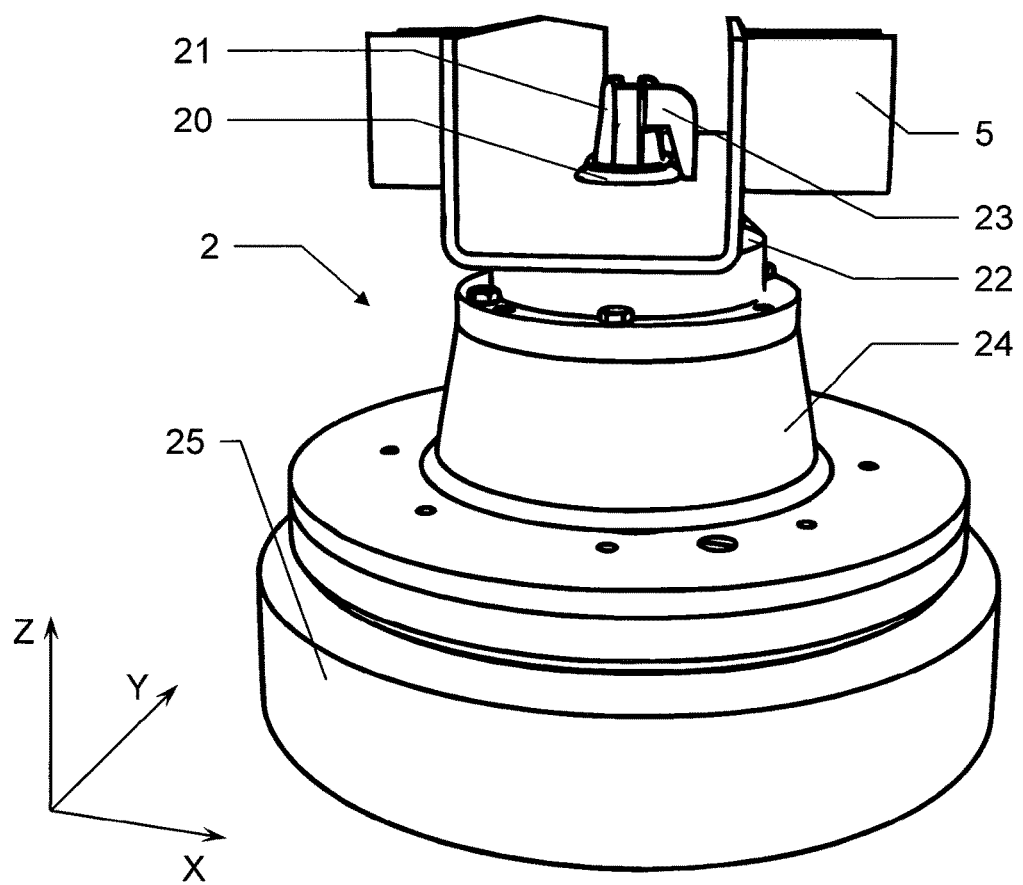
FIG. 5 shows an exemplary embodiment of the second positioning unit of a reference positioning system according to the invention.

In FIG. 5 an exemplary embodiment of the second positioning unit 2 of a reference positioning system according to the invention is depicted. It is designed for being contacted by the second alignment feature 20 of the workpiece 5, which comprises an elongated slot. Like the first positioning unit the second positioning unit 2 comprises a fixed group 25, on which the second centring pin 21 and a floating group 24 are mounted. The floating group 24 is mounted on the fixed group 25 movably in the first and second dimension X,Y and fixedly with respect to the third dimension Z. The floating group 24 comprises a second reference level locator 22 located at a known distance from the workpiece's reference level $Z_0$ in the XY-plane and defining a second contact level $Z_2$. The centring pin 21 is mounted movably in the third dimension Z and immovably with respect to the first and second dimension X,Y. The centring pin 21 preferably has a pyramidal shape and is designed for being introduced into an elongated slot.

A further aspect of the invention is a positioning unit as a stand-alone solution, as every one of the positioning units described above in the FIGS. 3a-d, 4a-b and 5 can also be used separately or in other combinations than that of the described reference positioning system. This includes the clamping functionality as well as the movable centring pins. One or more positioning units can thus be used to position a workpiece and clamp it in place for inspection, treatment or machining.

A first embodiment of this aspect of the invention is a positioning unit for positioning an alignment feature of a workpiece at least in a third dimension of a three-dimensional coordinate system, comprising a reception unit with a centring pin and a reference level locator defining a contact level that is located at a defined distance from a workpiece reference level, wherein the positioning unit comprises clamping means for fixing the first alignment feature to the first reference level locator.

A second embodiment of this aspect of the invention is a positioning unit according to the first embodiment, additionally comprising clamping means for fixing the first alignment feature to the first reference level locator, wherein the clamping means of this positioning unit in particular comprise a hook being provided in the centring pin, and/or a magnet or a suction pad being provided in the reference level locator.

A third embodiment of this aspect of the invention is a positioning unit according to the first or second embodiment, additionally comprising clamping means for fixing the first alignment feature to the first reference level locator, wherein for levelling the alignment feature in the contact level the centring pin of this positioning unit is movable in the third dimension relative to the first reference level locator and in such a way that the first contact level is traversable by at least a part of the first centring pin, in particular wherein the clamping means comprise the structural features as described in FIGS. 4a and 4b.

Although the invention is illustrated above, partly with reference to some preferred embodiments, it must be understood that numerous modifications and combinations of different features of the embodiments can be made. All of these modifications lie within the scope of the appended claims.

What is claimed is:

1. A reference positioning system for positioning a workpiece in a three-dimensional coordinate system, the reference positioning system comprising:
   a first positioning unit for positioning a first alignment feature of the workpiece in a first dimension, in a second dimension and in a third dimension, comprising a first reception unit with a first centring pin and a first reference level locator defining a first contact level, the first alignment feature comprises a circular hole;
   a second positioning unit for positioning a second alignment feature of the workpiece in the second dimension and in the third dimension, comprising a second reception unit with a second centring pin and a second reference level locator defining a second contact level; and
   a third positioning unit for positioning a third alignment feature of the workpiece in the third dimension, comprising a third reception unit with a third reference level locator defining a third contact level;
   wherein the reference level locators are located at defined distances from a workpiece reference level;
   wherein for levelling the first alignment feature in the first contact level the first centring pin is movable in the third dimension relative to the first reference level locator and in such a way that the first contact level is traversable by at least a part of the first centring pin,
   wherein the first positioning unit furthermore comprises a fixed group and a floating group, the first reference level locator being a part of the floating group, wherein:
      the first centring pin is connected to the fixed group in such a way that it is movable in the third dimension and fixed in the first dimension and in the second dimension, the first centring pin being retractable into the fixed group at least partially behind the first reference level locator; and
      the floating group is connected to the fixed group in such a way that it is movable in the first dimension and in the second dimension and fixed in the third dimension.

2. The reference positioning system according to claim 1, wherein:
   the first reference level locator has a planar surface for contacting the first alignment feature, the surface being arranged in the first contact level.

3. The reference positioning system according to claim 1, wherein:
   a part of the first centring pin has a conical shape and is designed for being introduced into the circular hole of the first alignment feature.

4. The reference positioning system according to claim 1, wherein:
   for levelling the second alignment feature in the second contact level the second centring pin is movable:
      in the third dimension relative to the second reference level locator; and
      in such a way that the second contact level is traversable by at least a part of the second centring pin.

5. The reference positioning system according to claim 1, wherein at least a part of the second centring pin has a conical shape.

6. The reference positioning system according to claim 1, wherein at least a part of the second centering pin has a pyramidal or hipped-roof-like shape and is designed for being introduced into an elongated slot.

7. The reference positioning system according to claim 1, wherein:

at least the first positioning unit comprises clamping means for fixing the first alignment feature to the first reference level locator.

8. The reference positioning system according to claim 7, wherein the clamping means comprises at least one of:
a hook being provided in the first centring pin; and
a magnet or a suction pad being provided in the reference level locator.

9. The reference positioning system according to claim 1, wherein:
a movement of the first centring pin relative to the first contact level is controlled by at least one or more of actuators, motors, linear drives, pneumatic cylinders, and hydraulic cylinders.

10. The reference positioning system according to claim 1, wherein:
a movement of the first centring pin relative to the first contact level is controlled by at least one of spring loading and electromagnetic means.

11. The reference positioning system according to claim 1, wherein:
the second centring pin is movable in the third dimension.

12. The reference positioning system according to claim 1, wherein the third positioning unit comprises a third pin, which is cylindrical and/or movable in the third dimension.

13. The reference positioning system according to claim 1, wherein the reference positioning system comprises a fourth positioning unit.

14. The reference positioning system according to claim 1, wherein the floating group is movable with two degrees of freedom.

15. The reference positioning system according to claim 1, wherein the floating group is movable at least 5 mm in each direction.

16. A method for positioning and orienting a workpiece in a three-dimensional coordinate system by means of a reference positioning system;
the coordinate system having a first dimension, a second dimension and a third dimension;
the workpiece having at least three alignment features that are located at known positions of the workpiece;
the reference positioning system having at least three positioning units for contacting and positioning the alignment features; and
the positioning units are positionable with respect to the coordinate system, the method comprising:
placing the workpiece on the reference positioning system in such a way that a first alignment feature contacts a first positioning unit, the first alignment feature comprises a circular hole;
a second alignment feature contacts a second positioning unit; and
a third alignment feature contacts a third positioning unit;
aligning the first alignment feature in the first dimension and in the second dimension; and
relocating the first alignment feature to a first contact level of the third dimension, with maintaining the alignment of the first alignment feature in the first dimension and in the second dimension, wherein:
the first positioning unit comprises a fixed group, a floating group, a first reference level locator defining the first contact level and a first centring pin;
the first reference level locator is part of the floating group;
the first centring pin is connected to the fixed group in such a way that it is movable in the third dimension and fixed in the first dimension and in the second dimension, the first centring pin being retractable into the fixed group at least partially behind the first reference level locator; and
the floating group is connected to the fixed group in such a way that it is movable in the first dimension and in the second dimension and fixed in the third dimension; and
for relocating the first alignment feature, the first centring pin is moved in the third dimension relative to the first reference level locator and in such a way that the first contact level is traversed by at least a part of the first centring pin.

17. The method according to claim 16, wherein:
aligning the first alignment feature in the first dimension and in the second dimension comprises introducing the first centring pin into the circular hole; and
the first alignment feature is relocated by the first centring pin in such a way that the first alignment feature contacts the first reference level locator at the first reference level.

18. The method according to claim 16, wherein:
fixing the contact between the first alignment feature and the first positioning unit subsequently to the positioning and orienting of the workpiece, by means of clamping and/or magnetic forces.

19. The method according to claim 16, further comprising:
determining a position and orientation of the reference positioning system prior to a first placing of the workpiece on the reference positioning system and based on laser or photogrammetric principles, by means of at least one of:
a theodolite or a laser tracker; and
a measurement system of a measurement cell in which the workpiece is to be measured.

20. The method according to claim 16, further comprising:
defining a production tolerance of the workpiece, and
processing the workpiece subsequently to its positioning and orienting with the production tolerance, wherein an alignment accuracy of the positioning and orienting is at least one order of magnitude higher than the production tolerance.

21. The method according to claim 16, further comprising:
defining a measuring tolerance for features of the workpiece, and
measuring the features of the workpiece subsequently to its positioning and orienting, wherein an alignment accuracy of the positioning and orienting is at least one order of magnitude higher than the measuring tolerance of the measured features.

22. The method according to claim 16, wherein the workpiece is an automobile body part.

23. The method according to claim 16, wherein the reference positioning system is adapted for use in a measurement cell of an automotive production line.

24. One or more non-transitory computer-readable media storing one or more programs that are configured, when executed, to cause one or more processors to execute the method as recited in claim 16.

* * * * *